(12) United States Patent
Choi et al.

(10) Patent No.: US 6,822,722 B2
(45) Date of Patent: Nov. 23, 2004

(54) LIQUID CRYSTAL DISPLAY

(75) Inventors: Suk Won Choi, Anyang-si (KR); Su Seok Choi, Hanam-si (KR)

(73) Assignee: LG.Philips Co., Ltd., Seoul (KR)

( * ) Notice: Subject to any disclaimer, the term of this patent is extended or adjusted under 35 U.S.C. 154(b) by 0 days.

(21) Appl. No.: 09/944,099

(22) Filed: Sep. 4, 2001

(65) Prior Publication Data

US 2002/0033928 A1 Mar. 21, 2002

(30) Foreign Application Priority Data

Sep. 1, 2000 (KR) .......................................... 2000-51474

(51) Int. Cl.$^7$ ........................ G02F 1/1368; G02F 1/141
(52) U.S. Cl. ........................ 349/172; 349/38; 349/39
(58) Field of Search ................................ 349/37, 38, 39, 349/172, 173, 174; 345/92, 97

(56) References Cited

U.S. PATENT DOCUMENTS

| | | | | |
|---|---|---|---|---|
| 5,113,273 A | * | 5/1992 | Mochizuki et al. ............ 349/85 |
| 5,949,391 A | * | 9/1999 | Saishu et al. .................. 345/50 |
| 6,046,790 A | * | 4/2000 | Hara et al. .................... 349/172 |
| 6,351,301 B1 | * | 2/2002 | Takatori ....................... 349/172 |
| 6,417,828 B1 | * | 7/2002 | Sato et al. .................... 345/89 |
| 6,496,170 B1 | * | 12/2002 | Yoshida et al. ............... 345/87 |

* cited by examiner

Primary Examiner—Toan Ton
Assistant Examiner—Tai Duong
(74) Attorney, Agent, or Firm—Morgan, Lewis & Bockius, LLP

(57) ABSTRACT

A liquid crystal display is provided that includes liquid crystal pixel cells arranged at each intersection between a plurality of gate lines and a plurality of data lines, a thin film transistor associated with each pixel cell, a storage capacitor, and a smectic liquid crystal between an upper substrate and a lower substrate. The smectic liquid crystal has spontaneous polarization in a range of approximately 2 nC/cm$^2$ to 100 nC/cm$^2$ and a storage capacitance is in a range of approximately 1 nF/cm$^2$ to 13 nF/cm$^2$ for optimizing transmittance depending on the spontaneous polarization of the smectic liquid crystal.

1 Claim, 4 Drawing Sheets

LIQUID CRYSTAL DISPLAY

This application claims the benefit of Korean Application No. 2000-51474, filed in Korea on Sep. 1, 2000, which is hereby incorporated by reference.

BACKGROUND OF THE INVENTION

1. Field of the Invention

The present invention relates to a liquid crystal display. In particular, the present invention relates to a liquid crystal display (LCD) which effectively preserves applied voltage by employing an optimum storage capacitor.

2. Discussion of the Related Art

Liquid crystal has properties between solid and liquid, and its arrangement changes with a change in an applied voltage. Using this particular property in which the arrangement of the liquid crystal can be controlled by regulating applied voltage, it is possible to transmit or block light by regulating an applied voltage.

In an LCD, an intended image is displayed by regulating the amount of light entering the system. The LCD controls the light transmitted to a pixel according to a signal voltage of each pixel inputted from a driving circuit. In particular, an LCD that uses a thin film transistor (TFT) as a switching device for driving a pixel cell to transmit or block the light is called a TFT-LCD. Each pixel cell of a TFT-LCD has a pixel electrode that is connected with a TFT. The TFT functions as a switching device to turn on or off a corresponding pixel electrode.

Since the above-described TFT is an active element that is flexibly driven and is highly compatible with a variety of electrical applications, it is regarded as a preferred switching element for an LCD. Therefore, TFT design is a crucial factor in determining the display quality of an LCD.

In the TFT-LCD, each TFT switches between an on state to an off state. During an on state, an electric charge is supplied by first signal controlled by a TFT to a corresponding pixel cell electrode. During an off state, the charge on the pixel cell should be maintained to sustain the desired light transmissivity until a subsequent signal is applied. When the TFT turns on again the pixel cell is again charged with a electric charge from the subsequent signal. However, if a TFT is attached alone to the pixel cell electrode, it is difficult to maintain the electric charge during the off state. Since it is necessary to maintain the transmitted charge of the first signal until the subsequent signal is applied to a pixel electrode, a storage capacitor is used to increase a storage capacitance and is connected in parallel to the liquid crystal. The storage capacitor can be attached to either nearby gate electrode (Storage On Gate Method) or a common line apart from the gate electrode (Storage On Common Method).

With reference to FIGS. 1A and 1B, the related art TFT-LCD will now be briefly explained. FIG. 1A is a schematic view of a substrate of a liquid crystal display using the storage on gate method. FIG. 1B is a schematic view of a substrate of a liquid crystal display using the storage on common method. As shown in FIGS. 1A and 1B, a substrate of a liquid crystal display includes a pixel electrode 104 that is transparent and electrically conductive to apply voltage to a liquid crystal cell, a data line 102 for providing a data signal, a gate line 101 for providing a gate signal, a TFT for transmitting a data signal of a data line 102 to a pixel electrode 104 according to a gate signal of a gate line 101, and a capacitor 103 for maintaining the applied voltage for a certain duration.

The TFT includes an island-type semiconductor layer (not shown) formed on gate electrode 105 with an intervening insulating layer (not shown). A source electrode 106 and a drain electrode 107 are provided on the semiconductor layer at a predetermined distance from each other. The pixel electrode 104 is electrically connected to the drain electrode 107 of the TFT.

During operation of the above-described LCD configuration, a gate pulse is first applied to the gate electrode 105 of the gate line 101 to switch the TFT to an ON state and thereby activate a pixel electrode 104 with an appropriate voltage. In the ON state, a conductive channel is formed at the semiconductor region of the TFT as electrons become concentrated in the semiconductor region adjacent the gate electrode, resulting in a flow of current between a source electrode 106 and a drain electrode 107.

Thereafter, the pixel electrode that is connected to the drain electrode 107 of the above TFT is provided with a data voltage. If no gate pulse is applied to the gate electrode 105, the TFT is turned off and the charge formed by the applied data voltage to a pixel electrode 104 is maintained until the next signal voltage is applied, thereby causing the LCD to provide the intended images.

Based on the foregoing operation, the LCD applies a gate pulse to every gate electrode 101 in sequence and enables all pixels by applying a data voltage to every source electrode according to a time-sharing method.

Maintaining the applied data voltage is possible because the liquid crystal is dielectric. However, the liquid crystal itself has low voltage holding ratio (VHR) because a capacitance formed by a permittivity within the liquid crystal is insufficient. To compensate for this, an additional storage capacitor 103 is provided for increasing storage capacitance. Capacitor 103 is usually connected in parallel to improve the VHR, and thus enhance maintaining the data voltage.

FIGS. 2A and 2B illustrate a VHR of a liquid crystal display. As shown in FIG. 2A, if a storage capacitance value (Csto) is 0, then the VHR is low. On the other hand, if the storage capacitance value is sufficiently greater than 0 as shown in FIG. 2B, the VHR is increased accordingly. Therefore, by adding the storage capacitor 103, the voltage holding ratio is enhanced according to the storage capacitance (Csto) of the storage capacitor 103.

If a smectic liquid crystal having spontaneous polarization is employed in the LCD, an operating speed can be increased. However, due to a low VHR in smectic liquid crystal, a data voltage applied to the liquid crystal cell leaks soon after the applied data voltage is turned off. Thus, smectic liquid crystal cannot be used for the LCD unless an additional storage capacitor 103 is provided to enhance the VHR.

However, while the storage capacitor 103 may improve the VHR, it also causes an aperture ratio to decrease, resulting in a reduction of an available transmission region of a pixel portion. Consequently, a TFT-LCD that operates by maintaining a constant voltage includes an additional capacitor may enhance the low VHR of the smectic liquid crystal, but the additional capacitor causes a decrease in the aperture ratio.

SUMMARY OF THE INVENTION

Accordingly, the present invention is directed to a liquid crystal display (LCD) that substantially obviates one or more of the problems due to limitations and disadvantages of the related art.

An object of the present invention is to provide an LCD with an additional storage capacitor to improve a voltage holding ratio (VHR) of a smectic liquid crystal for blocking or transmitting light while preventing a decrease in the aperture ratio.

Additional features and advantages of the invention will be set forth in the description which follows, and in part will be apparent from the description, or may be learned by practice of the invention. The objective and other advantages of the invention will be realized and attained by the structure particularly pointed out in the written description and claims hereof as well as the appended drawings.

To achieve these and other advantages and in accordance with the purpose of the present invention, as embodied and broadly described, the LCD includes liquid crystal pixel cells arranged at each intersection between a plurality of gate lines and a plurality of data lines, a thin film transistor associated with each pixel cell, a storage capacitor; and a smectic liquid crystal between an upper substrate and a lower substrate. The smectic liquid crystal has spontaneous polarization in a range of approximately 2 $nC/cm^2$ to 100 $nC/cm^2$ and a storage capacitance is in a range of approximately 1 $nF/cm^2$ to 13 $nF/cm^2$ for optimizing transmittance according to a spontaneous polarization size.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

According to the present invention, an LCD including an additional storage capacitor with an optimum storage capacitance according to a spontaneous polarization of a smectic liquid is very advantageous in improving a voltage holding ratio (VHR) of the smectic liquid, and thus the contrast and transmissivity of the LCD.

As explained above, an LCD exhibits an intended image by applying voltage to a pixel electrode and turning the pixel electrode on or off. The pixel electrode can be turned on or off by controlling the on/off functions of a TFT connected to the pixel electrode. When a TFT is in an off state, by using a voltage maintaining method the applied data voltage is maintained until the next data voltage is applied, which allows the LCD to exhibit an intended image.

Maintaining the applied data voltage is possible because the liquid crystal is dielectric, but if the TFT is employed alone for switching of a pixel electrode, the charge applied to the pixel electrode leaks immediately after a data voltage arrives. Therefore, an additional storage capacitor must be provided in order to maintain the charge applied to the pixel electrode.

In the case of smectic liquid that has spontaneous polarization and ferroelectricity, it is particularly difficult to maintain the applied voltage because the VHR of smectic liquid crystal is very low. Hence, an additional storage capacitor is provided for increasing the voltage holding ratio of the smectic liquid to thereby deriving appropriate properties for the LCD.

Figure 1A:
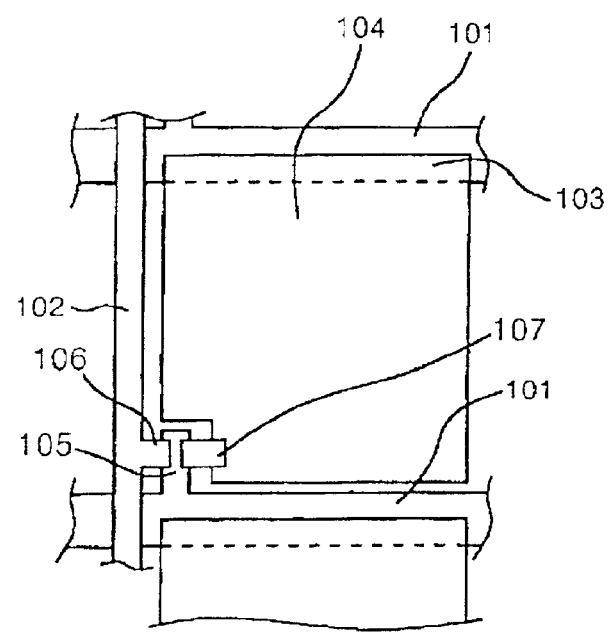
FIG. 1A is a schematic diagram illustrating a first related art liquid crystal display.
Figure 1B:
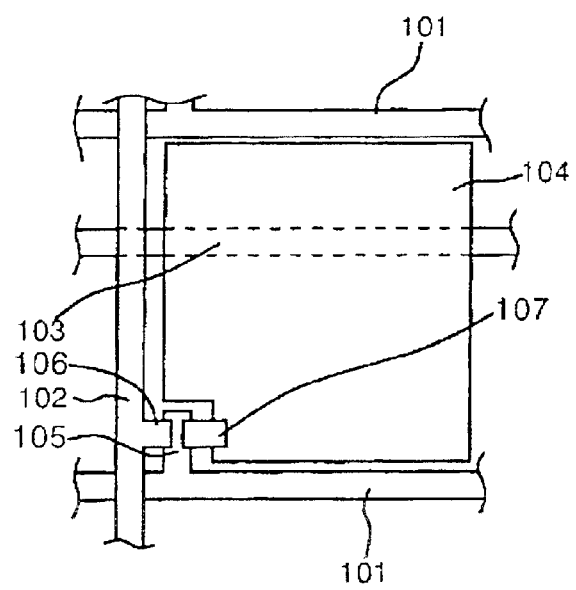
FIG. 1B is a schematic diagram illustrating a second related art liquid crystal display.
Figure 2:
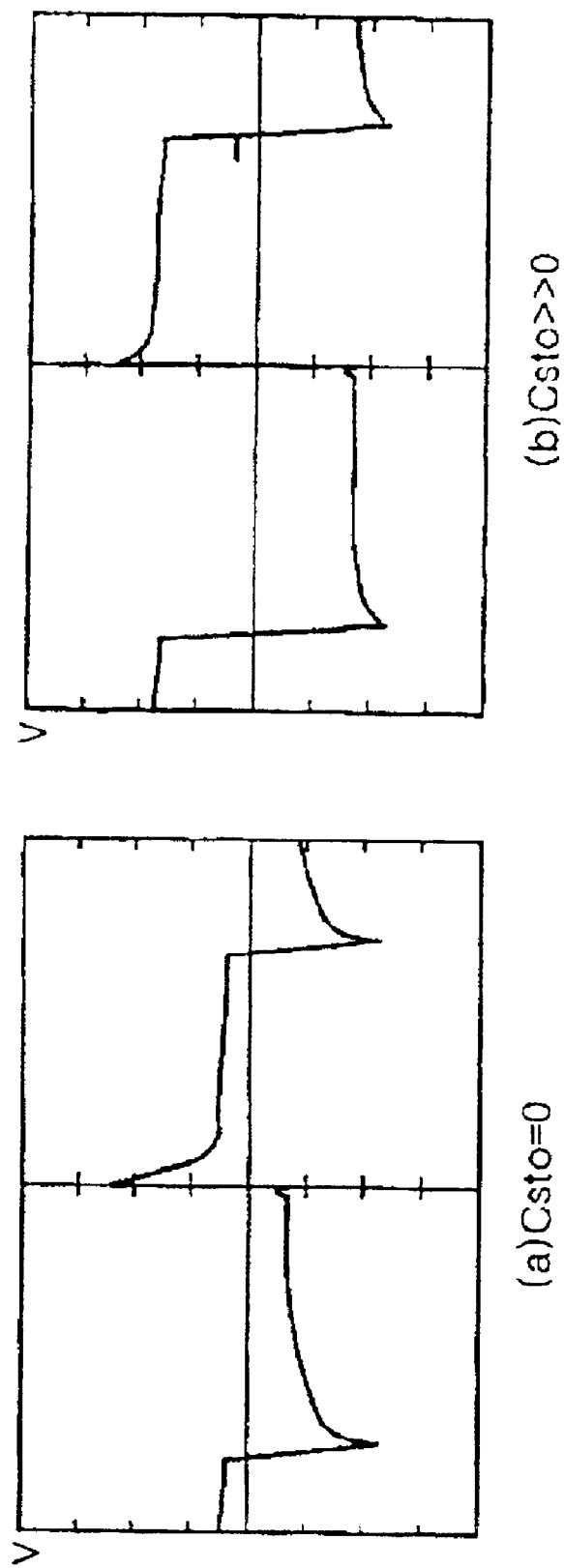
FIGS. 2A and 2B are graphs illustrating a voltage holding ratio of a liquid crystal display.
Figure 3:
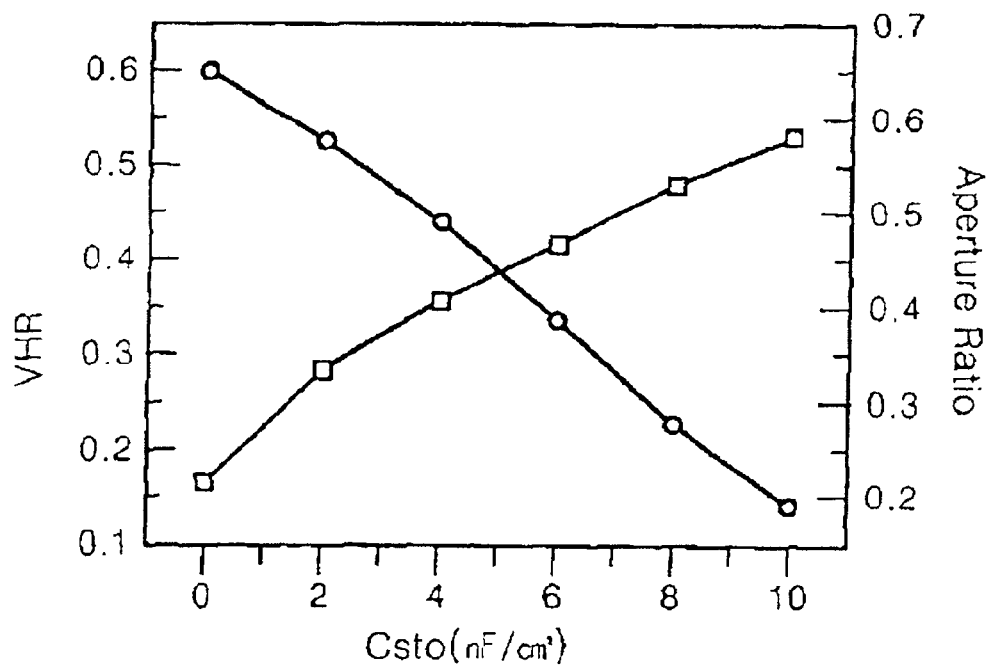
FIG. 3 is a graph illustrating an exemplary relationship between a voltage holding ratio and an aperture ratio of a liquid crystal display.

Unfortunately, a storage capacitor reduces a transmittable region of a pixel electrode and consequently decreases an aperture ratio of the LCD. FIG. 3 illustrates the relationship between the storage capacitance value (Csto), the VHR and the aperture ratio. As shown in FIG. 3, as the Csto of a storage capacitor gets greater, the VHR becomes higher, but an aperture ratio decreases.

In the present invention, a storage capacitance simultaneously optimizes the voltage holding ratio and the aperture ratio. Due to the fact that the smectic liquid crystal is a substance having spontaneous polarization and ferroelectricity, the relationship between the VHR and the aperture ratio largely depends on the spontaneous polarization. Accordingly, the present invention focuses on the spontaneous polarization for optimizing the properties of the VHR and the aperture ratio.

Figure 4:
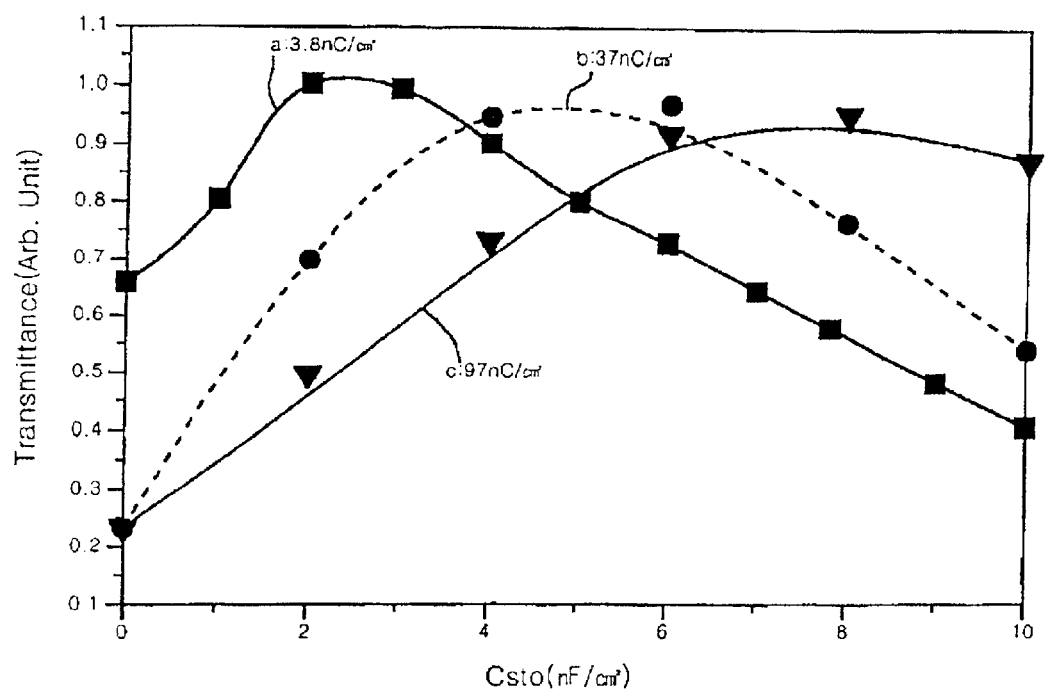
FIG. 4 is a graph illustrating a transmittance characteristic depending on spontaneous polarization of smectic liquid crystal and transmittance of a storage capacitance according to an exemplary embodiment of the present invention.

Referring to FIG. 4, the LCD of the present invention uses smectic liquid crystal to block or transmit light, and has an additional storage capacitor for improving the voltage holding ratio of the smectic liquid crystal. The spontaneous polarization of the smectic liquid crystal is in a range of 2 $nC/cm^2$ to 100 $nC/cm^2$ and a unit storage capacitance of the storage capacitor is in a range of 1 $nF/cm^2$ to 13 $nF/cm^2$.

Preferably, if the spontaneous polarization of the smectic liquid crystal is in a range of 2 $nC/cm^2$ to 10 $nC/cm^2$, then the unit storage capacitance of the capacitor should be in the range of 1 $nF/cm^2$ to 4.5 $nF/cm^2$.

Particularly, if the spontaneous polarization of the smectic liquid crystal is 3.8 $nC/cm^2$, the unit storage capacitance of the capacitor is 2.2 $nF/cm^2$.

In addition, if the spontaneous polarization of the smectic liquid crystal is in a range of 10 $nC/cm^2$ to 70 $nC/cm^2$, the unit storage capacitance of the capacitor is in a range of 4 $nF/cm^2$ to 7 $nF/cm^2$.

Moreover, if the spontaneous polarization of the smectic liquid crystal is 37 $nC/cm^2$, the unit storage capacitance of the capacitor is 4.6 $nF/cm^2$.

Further, if the spontaneous polarization of the smectic liquid crystal is in a range of 70 $nC/cm^2$ to 100 $nC/cm^2$, and the unit storage capacitance of the capacitor is in a range of 5 $nF/cm^2$ to 13 $nF/cm^2$.

Still further, if the spontaneous polarization of the smectic liquid crystal is 97 $nC/cm^2$, the unit storage capacitance of the capacitor is 6.8 $nF/cm^2$.

As explained hereto, an LCD of the present invention employing smectic liquid crystal includes a storage capacitor for improving the low voltage holding ratio of the smectic liquid crystal. Further, in order for the storage capacitance of the capacitor to have the maximum transmittance in consideration of the relationship of a voltage holding ratio and an aperture ratio, the storage capacitance of the capacitor should have a value corresponding to the spontaneous polarization of the smectic liquid crystal.

In particular, it is preferred that as the spontaneous polarization becomes greater, the storage capacitance of a storage capacitor should also increase accordingly. Therefore, the present invention provides a means to improve a voltage holding ratio of the LCD in the case of the spontaneous polarization of smectic liquid crystal by utilizing the relationship of the voltage holding ratio and the aperture ratio. As the voltage holding ratio is enhanced, contrast and transmittance of the LCD improves.

Thus, the storage capacitor for the LCD according to the present invention is provided for increasing the voltage holding ratio of the smectic liquid crystal having a low voltage holding ratio. Optimum storage capacitance is achieved by utilizing the relationship between the voltage holding ratio and the aperture ratio according to spontaneous polarization of the smectic polarization, resulting in an optimized contrast and the aperture ratio of the LCD.

It will be apparent to those skilled in the art that various modifications and variations can be made in the LCD of the present invention without departing from the spirit and scope of the invention. Thus, it is intended that the present invention cover the modifications and variations of this invention provided they come within the scope of the appended claims and their equivalents.

What is claimed is:

1. A liquid crystal display including liquid crystal pixel cells arranged at each intersection between a plurality of gate lines and a plurality of data lines, comprising:

a thin film transistor associated with each pixel cell;

a storage capacitor; and a smectic liquid crystal between an upper substrate and a lower substrate, wherein the smectic liquid crystal has spontaneous polarization in a range of 2 $nC/cm^2$ to 10 $nC/cm^2$ and a unit storage capacitance is in a range of 1 $nF/cm^2$ to 4.5 $nF/cm^2$ for optimizing transmittance depending on the spontaneous polarization of the smectic liquid crystal.

* * * * *